(12) United States Patent
Spitzauer et al.

(10) Patent No.: US 10,385,276 B2
(45) Date of Patent: Aug. 20, 2019

(54) WASTE TO FUEL PROCESSES, SYSTEMS, METHODS, AND APPARATUSES

(71) Applicant: GPI PATENT HOLDING LLC, Issaquah, WA (US)

(72) Inventors: Michael P. Spitzauer, Kennewick, WA (US); James D. Osterloh, West Richland, WA (US)

(73) Assignee: GPI PATENT HOLDING LLC, Issaquah, WA (US)

( * ) Notice: Subject to any disclaimer, the term of this patent is extended or adjusted under 35 U.S.C. 154(b) by 157 days.

(21) Appl. No.: 15/187,506

(22) Filed: Jun. 20, 2016

(65) Prior Publication Data

US 2016/0369171 A1  Dec. 22, 2016

Related U.S. Application Data (60) Continuation of application No. 13/461,575, filed on May 1, 2012, now Pat. No. 9,371,492, which is a
(Continued)

(51) Int. Cl.
*C10G 1/06* (2006.01)
*C10G 1/10* (2006.01)
(Continued)

(52) U.S. Cl.
CPC ............ *C10G 1/06* (2013.01); *B01J 19/1812* (2013.01); *B01J 19/2415* (2013.01); *C10G 1/08* (2013.01); *C10G 1/083* (2013.01); *C10G 1/086* (2013.01); *C10G 1/10* (2013.01); *C10L 1/04* (2013.01); *C10L 1/08* (2013.01); *B01J 2219/00103* (2013.01); *B01J 2219/24* (2013.01); *C10G 2300/1003* (2013.01);
(Continued)

(58) Field of Classification Search
USPC ......................................................... 422/261
See application file for complete search history.

(56) References Cited

U.S. PATENT DOCUMENTS 1,664,723 A   4/1928  Young
2,246,252 A   6/1941  Hummel
(Continued)

FOREIGN PATENT DOCUMENTS

DE          394635         4/1924
DE       195 47 259 A1     6/1997
(Continued)

OTHER PUBLICATIONS

WO PCT/US08/064577, Search Report, dated Feb. 20, 2009, GPI Patent Holding, Inc.
(Continued)

*Primary Examiner* — Nina Bhat
(74) *Attorney, Agent, or Firm* — Wells St. John P.S.

(57) ABSTRACT

A waste material process reactor is configured to convers waste to fuel by exposing a carbon-based material to liquid media to form hydrocarbon fuel. Heat exchangers, power generation processes and combustion turbine exhaust apparatus are also provided. Fuel generation processes and generation systems are provided. Reaction media conduit systems as well as processes for servicing reactant media pumps coupled to both inlet and outlet conduits containing reactant media, are also provided.

8 Claims, 8 Drawing Sheets

Related U.S. Application Data division of application No. 12/108,438, filed on Apr. 23, 2008, now abandoned.

(51) Int. Cl.
| | | |
|---|---|---|
| *C10L 1/04* | (2006.01) | |
| *C10L 1/08* | (2006.01) | |
| *C10G 1/08* | (2006.01) | |
| *B01J 19/18* | (2006.01) | |
| *B01J 19/24* | (2006.01) | |

(52) U.S. Cl.
CPC ............ *C10G 2300/1014* (2013.01); *C10G 2300/301* (2013.01); *C10G 2400/04* (2013.01); *C10G 2400/08* (2013.01); *C10L 2200/0469* (2013.01); *C10L 2290/06* (2013.01); *Y02E 50/14* (2013.01); *Y02E 50/30* (2013.01); *Y02P 30/20* (2015.11)

(56) References Cited

U.S. PATENT DOCUMENTS

| | | |
|---|---|---|
| 4,111,787 A | 9/1978 | Aldridge et al. |
| 4,300,009 A * | 11/1981 | Haag ................. C07C 1/00 585/240 |
| 4,320,241 A | 3/1982 | Frankiewicz |
| 4,396,786 A | 8/1983 | Bond et al. |
| 4,678,860 A | 7/1987 | Kuester |
| 4,728,418 A | 3/1988 | Shabtai et al. |
| 4,982,027 A | 1/1991 | Korff et al. |
| 5,186,722 A | 2/1993 | Cantrell et al. |
| 5,233,109 A | 8/1993 | Chow |
| 5,321,174 A | 6/1994 | Evans et al. |
| 5,504,259 A | 4/1996 | Diebold et al. |
| 5,616,154 A | 4/1997 | Elliott et al. |
| 5,735,916 A | 4/1998 | Lucas et al. |
| 5,959,167 A | 9/1999 | Shabtai et al. |
| 6,056,793 A | 5/2000 | Suppes |
| 6,133,491 A | 10/2000 | Xing |
| 6,172,272 B1 | 1/2001 | Shabtai et al. |
| 6,270,655 B1 | 8/2001 | Ganguli |
| 6,558,442 B2 | 5/2003 | Donovan et al. |
| 6,953,873 B2 * | 10/2005 | Cortright ................. C07C 1/20 585/357 |
| 7,262,331 B2 | 8/2007 | Van de Beld et al. |
| 7,473,348 B2 | 1/2009 | Koch |
| 8,075,642 B2 | 12/2011 | Dumesic et al. |
| 9,657,990 B2 | 5/2017 | Tandon |
| 2003/0153797 A1 | 8/2003 | Percell |
| 2004/0182001 A1 | 9/2004 | Masemore et al. |
| 2005/0115871 A1 | 6/2005 | Koch |
| 2005/0241992 A1 | 11/2005 | Lott et al. |
| 2006/0194996 A1 | 8/2006 | Umansky et al. |
| 2007/0066077 A1 | 3/2007 | Suyama et al. |
| 2007/0131585 A1 | 6/2007 | Koch |
| 2009/0145392 A1 | 6/2009 | Clark et al. |
| 2011/0011722 A1 | 1/2011 | Rinker |
| 2011/0068036 A1 | 3/2011 | Ji et al. |
| 2011/0098494 A1 | 4/2011 | Weiss et al. |
| 2011/0245356 A1 * | 10/2011 | Onishi ................. B01J 8/22 518/712 |
| 2014/0121426 A1 * | 5/2014 | Tandon ................. C10G 31/10 585/241 |

FOREIGN PATENT DOCUMENTS

| | | |
|---|---|---|
| EP | 0 055 556 A | 7/1982 |
| EP | 0 702 076 A | 3/1996 |
| EP | 0 770 664 A | 5/1997 |
| EP | 1052279 | 11/2000 |
| EP | 1 681 337 A | 7/2006 |
| GB | 218 278 A | 4/1925 |
| GB | 424 847 A | 3/1935 |
| GB | 1 390 239 A | 4/1975 |
| GB | 1390356 | 4/1975 |
| JP | 02-102295 | 4/1990 |
| JP | 08-283745 | 10/1996 |
| JP | 2004045013 | 2/2004 |
| MY | PI2010004974 | 9/2014 |
| WO | WO 02/074881 A | 9/2002 |
| WO | WO 2005/078049 A | 8/2005 |
| WO | PCT/US08/064577 | 10/2010 |

OTHER PUBLICATIONS

WO PCT/US08/064577, Written Opinion, dated Feb. 20, 2009, GPI Patent Holding, Inc.

* cited by examiner

WASTE TO FUEL PROCESSES, SYSTEMS, METHODS, AND APPARATUSES

CROSS REFERENCE TO RELATED APPLICATION

This patent is a divisional of U.S. patent application Ser. No. 13/461,575 which was filed on May 1, 2012, now U.S. Pat. No. 9,371,492 issued Jun. 21, 2016, entitled "Waste to Fuel Processes, Systems, Methods, and Apparatuses", which is a divisional of U.S. patent application Ser. No. 12/108,438 filed Apr. 23, 2008, entitled "Production Processes, Systems, Methods, and Apparatuses", the entirety of each of which is incorporated by reference herein.

TECHNICAL FIELD

The present disclosure relates to production processes and more specifically to fuel production processes.

BACKGROUND

Each day the need for economically reasonable fuel sources becomes increasingly important. Similarly the need to dispose of waste in an economical yet environmentally friendly method is also highly desirable. The present disclosure provides processes for the conversion of carbon-based material such as waste material into fuel, fuel that may be used to power turbines and/or vehicles.

SUMMARY OF THE DISCLOSURE

The present disclosure provides production processes that can include exposing a carbon-based material to liquid media to form hydrocarbon fuel.

Waste to fuel conversion processes are also provided that can include providing a low-moisture carbon-based waste material, and exposing the waste material to a liquid reaction media under a substantially oxygen-free atmosphere within a reactor. The processes can further provide for recovering gaseous hydrocarbon fuel from the reactor.

Waste to fuel processes can also include exposing a solid carbon-based material to a liquid reaction media to form a hydrocarbon fuel mixture. The fuel mixture can include non-condensable hydrocarbon fuel and condensable hydrocarbon fuel. Processes can proceed by separating the non-condensable hydrocarbon fuel from the condensable hydrocarbon fuel.

Waste material processing reactors are provided that can be configured to convert waste to fuel. The reactors can include a substantially columnar vessel extending along the vessel walls from a base portion to a top portion. An opening can be provided within the top portion of the vessel and the opening can be configured to receive carbon-based waste material. A liquid media conduit can be provided that extends from the base portion to the top portion of the vessel with the conduit being configured to circulate liquid media from within the base portion of the reactor to the top portion of the reactor.

Power generation processes are provided that can include exposing solid carbon-based material to a liquid reaction media to form non-condensable hydrocarbon fuel. The processes can continue by providing the non-condensable hydrocarbon fuel to a combustion turbine to generate power.

Combustion turbine exhaust apparatus are also provided that can include a substantially columnar housing extending along a plane from an inlet portion to outlet portion. The apparatus can also include a substantially columnar exhaust chute within the housing and extending parallel along the plane with the exhaust chute recessed from the walls of the housing. The exhaust chute and housing can define a space between the chute and housing within the apparatus. A plurality of heating fluid conduits can be provided within the space and extending along the plane.

Fuel generation processes are provided that can include exposing a solid carbon-based material to a liquid reaction media to form a mixture of hydrocarbon fuel and separating the fuel into at least two portions, a first portion and a second portion. The process can also include providing the first portion to a combustion turbine to generate power, and storing the second portion for use as fuel.

Fuel generation systems are provided that can include a reactor configured to house a liquid reaction media and receive solid carbon-based material. Systems can also include a distillation apparatus coupled to the reactor and configured to receive gaseous hydrocarbon fuel from the reactor. In accordance with example embodiments, the system can include a combustion turbine coupled to the distillation apparatus and configured to receive distillate portions from the distillation apparatus.

Reaction media conduit systems are also provided than can include conduits coupled to a reaction media pump with a portion of the conduit proximate the pump comprising a jacket defining a volume configured to receive a refrigerant material.

Processes for servicing reactant media pumps coupled to both inlet and outlet conduits containing reactant media are also provided with the process, including at least partially solidifying portions of the reactant media proximate to the pump and within each of the inlet and outlet conduits and uncoupling at least a portion of the pump from either of the conduits while maintaining a majority of the reactant media within the conduits.

BRIEF DESCRIPTION OF THE DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
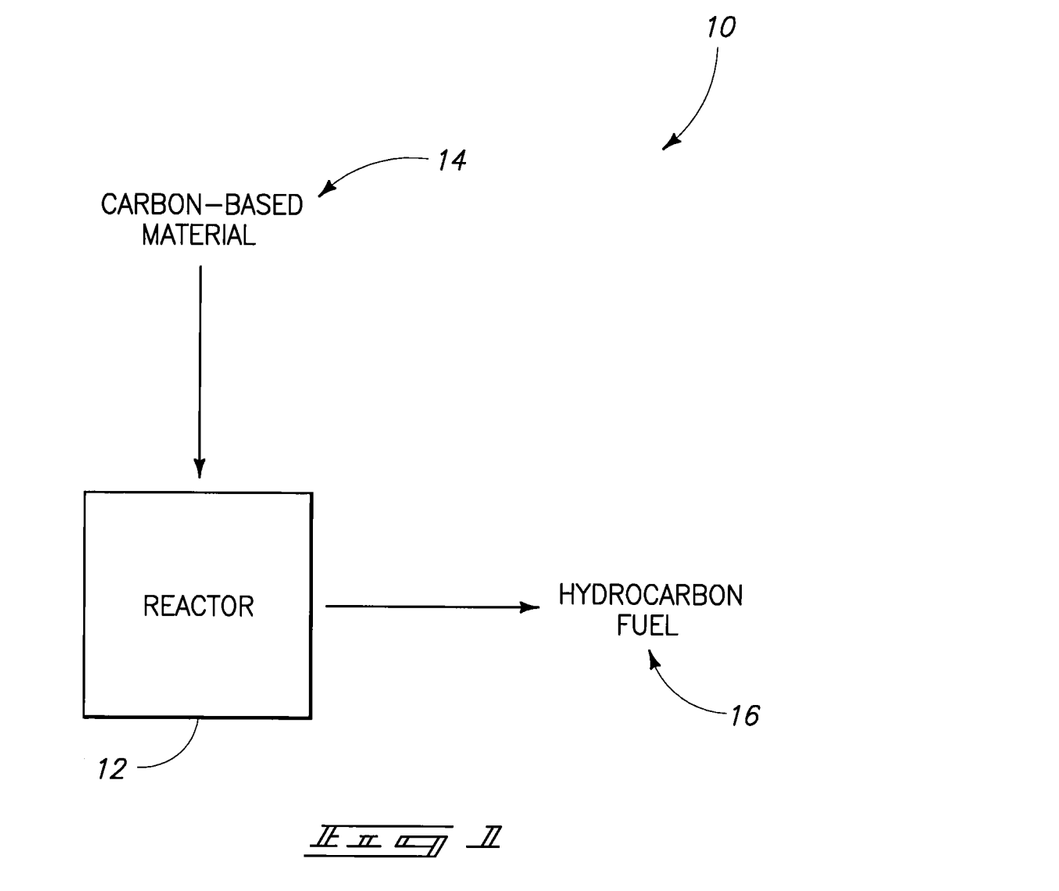
FIG. 1 is a system according to an embodiment of the disclosure.

Processes and systems according to the present disclosure are described with reference to FIGS. 1-7. Referring first to FIG. 1, a system 10 is disclosed that includes a reactor 12 configured to receive carbon-based material 14 and form hydrocarbon fuel 16. According to an example implementation, reactor 12 can house a liquid media. An example liquid media comprises a petroleum-based material, and such petroleum-based material may have a boiling point of at least about 290° C. One example petroleum-based material is that provided by 76 Lubricants® (a division of ConocoPhillips, 600 N. Dairy Ashford, Houston, Tex. 77079-1175; 1-800-762-0942). Example materials from 76 Lubricants® used as liquid media can be the 76 Turbine Oil 100-460.

According to example implementations, this liquid media can also comprise a zeolite catalyst as well has have a boiling point of at least 290° C. This liquid media can be referred to as catalytic liquid media and/or catalytic cracking fluid, for example. According to example implementations, the catalyst utilized can be GPI Cat received from Tricat Industries Inc., Schilling Circle, Hunt Valley, Md. 21031 (Tel: (410) 785-7900; Fax: (410) 785-7901). The liquid reaction media can also comprise a lime material such as a hydrated lime. Example hydrated limes include Type S dolometic hydrated lime $(Ca(OH)_2 * Mg(OH)_2)$. Such hydrated lime materials can be acquired from the Chemical Lime Company at 3724 Hulen Street, Ft. Worth, Tex. 76107. This company can be reached at, for example, (817) 732-8164. The liquid reaction media in combination with either one or both of the lime and catalyst can be referred to as catalytic cracking fluid.

To this liquid media can be added a carbon-based material. Example carbon-based materials can comprise cellulose as well as hydrogen materials. Example carbon-based materials comprise fluff as well. Fabric, thread, plastic and wood can be used as carbon-based materials.

Materials 14 can include but are not limited to: industrial waste residue from commercial cleaners; solvents; lignite; bitumen; early stages of coal; sawdust; natural and synthetic fabrics; natural and synthetic fibers; acid alkyl sludges; acid tars; acidic pickling solutions acidifying agent; acids not otherwise specified; activated carbon from chlorine production; adhesives and sealants sludges containing halogenated solvents; adhesives and sealants sludges free of halogenated solvents; agrochemical wastes; alkaline solutions; alkalis not otherwise specified; ammonia; animal rendering; aqueous liquid waste from gas treatment and other aqueous liquid wastes; aqueous liquid waste from oil regeneration; aqueous solvent mixes containing halogens; aqueous solvent mixes free of halogens; aqueous washing liquids; aqueous washing liquids and mother liquors; bilge oils from inland navigation; bilge oils from jetty sewers; bilge oils from other navigation; bleach solutions and bleach fixer solutions; boiler dust; brake fluids; calcium arsenate; calcium hydroxidechelating agent; chlorinated emulsions; chlorinated engine, gear and lubricating oils; chlorine dioxide activator; chlorofluorocarbons, cyanide-free wastes containing chromium; cyanidic (alkaline) wastes containing heavy metals other than chromium; cyanidic (alkaline) wastes which do not contain heavy metals; degreasing wastes containing solvents without a liquid phase; desalter sludges or emulsions; discarded chemicals; electrolyte from batteries and accumulators; fixer solutions; flue gas dust; fly ash; fly ash and other flue gas treatment wastes; giberellic acid; grease and oil mixture from oil/waste water separation; halogenated filter cakes; spent absorbents; halogenated solvents and solvent mixes; halogenated still bottoms and reaction residues; halogenated wastes from dressing and finishing; hydrochloric acid; hydrofluoric acid; ink sludges containing halogenated solvents; ink sludges free of halogenated solvents; insulation materials containing asbestos; liquid wastes and sludges from metal treatment and coating of metals (e.g. galvanic processes, zinc coating processes, pickling processes, etching, phosphatizing, alkaline de-greasing); machining sludges; metal hydroxide sludges and other sludges from metal insolubilization treatment; metallic salts; nitric acid and nitrous acid; non-chlorinated emulsions, oil fly ash; oil spills; oil/water separator sludges; oil/water separator solids; oily sludges; organic halogenated solvents, washing liquids and mother liquors filter cake from gas treatment; gaseous substances and preparations which are flammable in air at normal pressure; hydraulic oils containing only mineral oil; hydraulic oils containing PCBs or PCTs; insulating or heat transmission oils and other liquids containing PCBs or PCTs; interceptor sludges; lead batteries; liquid municipal waste; liquid restaurant and food factory waste; liquid substances and preparations having a flash point below 21° C. (including extremely flammable liquids); organochlorinated wood preservatives; organometallic wood preservatives; other chlorinated hydraulic oils (not emulsions); phosphoric and phosphorous acid; photo chemicals; pulp & paper sludge; salts and solutions containing cyanides; saturated or spent ion exchange resins; skimmings; sludges and solids from tempering processes; sludges containing halogenated solvents; sludges containing mercury; sludges containing other solvents; sludges from gas treatment; sludges from paint or varnish removal containing halogenated solvents; sludges from paint or varnish removal free of halogenated solvents; sludges from zinc hydrometallurgy (including jarosite, goethite); sludges or solid wastes containing halogenated solvents; sludges or solid wastes containing solvents; soda; solid municipal waste; solid restaurant and food factory waste; solid substances and preparations which may readily catch fire after brief contact with a source of ignition and which continue to burn or to be consumed after removal of the source of ignition; solid waste from gas treatment; solutions and sludges from regeneration of ion exchangers; solvent based developer solutions; solvent mixes or organic liquids free of halogenated solvents; solvents; solvents and solvent mixes free of halogenated solvents; spent activated carbon; spent activated carbon from flue gas treatment; spent filter clays; spent waxes and fats; steam degreasing wastes; styrofoam packing; styrofoam peanuts; substances and preparations capable by any means, after disposal, of yielding another substance, e.g. a leachate, which possesses any of the characteristics listed above; substances and preparations which may become hot and finally catch fire in contact with air at ambient temperature without any application of energy; substances and preparations which release toxic or very toxic gases in contact with water, air or an acid; substances and preparations which, in contact with water or damp air, evolve highly flammable gases in dangerous quantities; sulphuric acid; sulphuric acid and sulphurous acid; synthetic insulating and heat transmission oils and other liquids; synthetic machining oils; tank bottom sludges; tars and other carbon-containing wastes from anode manufacture; tires; vitrified wastes and wastes from vitrification; waste acidic solutions; waste adhesives and sealants containing halogenated solvents; waste adhesives and sealants free of halogenated solvents; waste containing silver from on-site treatment of photographic waste; waste from agricultural, horticultural, hunting, fishing and aquaculture primary production, food preparation and processing; waste from electrolytic refining; waste from marine transport tank cleaning, containing chemicals; waste from marine transport tank cleaning, containing oil; waste from natal care, diagnosis, treatment or prevention of disease in humans; waste from natural gas purification; waste from railway and road transport tank cleaning, containing chemicals; waste from railway and road transport tank cleaning, containing oil; waste from research, diagnosis, treatment or prevention of disease involving animals; waste from solvent and coolant recovery (still bottoms); waste from storage tank cleaning, containing chemicals; waste from storage tank cleaning, containing oil; waste from the pyrolytic treatment of coal; waste from transport and storage tank cleaning; waste hydraulic oils and brake fluids; waste ink containing halogenated solvents; waste ink free of halogenated solvents; waste insulating and heat transmission oils and other liquids; waste machining emulsions containing halogens; waste machining emulsions free of halogens; waste machining oils containing halogens (not emulsioned); waste machining oils free of halogens (not emulsioned); material finishing wastes such as waste paints and varnish containing halogenated solvents, waste paints and varnish free of halogenated solvents; and wastes and sludges from non-ferrous hydrometallurgical processes.

Wastes such as the following can be utilized carbon-based materials: wastes from human or animal health care and/or related research (excluding kitchen and restaurant wastes which do not arise from immediate health care); wastes from incineration or pyrolysis of municipal and similar commercial, industrial and institutional wastes; wastes from metal decreasing and machinery maintenance; wastes from oil regeneration; wastes from organic chemical processes; wastes from petroleum refining, natural gas purification and pyrolytic treatment of coal; wastes from power station and other combustion plants; wastes from shaping (including forging, welding, pressing, drawing, turning, cutting and filing); wastes from shaping and surface treatment of metals and plastics; wastes from specific physical/chemical treatments of industrial wastes (e.g. dechromatation, decyanidation, neutralization); wastes from textile industry such as cleaning and degreasing of natural products; wastes from the leather industry; wastes from the manufacture, formulation, supply and use of coatings (paints, varnishes and vitreous enamels), adhesive, sealants and printing inks; wastes from waste treatment facilities, off-site waste water treatment plants and the water industry; waste streams such as wastes from waste water treatment plants; wastes from water and steam degreasing processes; and wastes from wood processing and the production of paper, cardboard, pulp, panels and furniture.

Materials 14 can also include but are not limited to: numerous polymeric materials such as; rubber, including that from automobile tires; mixed waste plastics, as small crumbs, or granules; granulate from used tires and granulated textiles from the tires, including the PVC portion; rubber and motor-car tire foam; pvc; styrofoam.

Materials 14 can also include but are not limited to: waste oils, waxes and fats, for example (including hydraulic oils and transformer oils); used mineral oils, including PCB contaminated transformer oils (pyralene); residues of the vacuum distillation in oil refineries; engine grease and other lubricants; vegetable oils; waste oils; waxes and fats of all kinds including the oil of the electrical changing of currency and hydraulic oils; all refinery arrears, bitumen, tars, etc.; paint; and glycerine.

Materials 14 can also include but are not limited to: agricultural materials (including animal waste products, spoiled food, etc.); biomass; wood products such as cardboard; slaughterhouse residues (bones, meat etc); animal waste products and spoiled food sugar plant bagasse; rice plants; shrubs; drugs; wheat; corn; tomatoes; oils and greases; palm waste; lubricants; crop protectant, growth regulator; inorganic pesticides, biocides and wood preserving agents; inorganic wood preservatives.

Materials 14 can also include but are not limited to: hospital waste materials; refinery by-products (bitumen, tars, for example); medical waste, sterilized; drains and dried biological materials; and autoclaved materials.

Materials 14 can also include but are not limited to: biological materials (wood, vegetables, meat wastes, etc.); household waste; lignite; sludge (paper, water treatment, etc); sewer sludge; paper sludge; municipal solid waste; municipal liquid waste; human waste; diapers; clothing; shoes; hair; vegetables; fruits; leather; animal waste; algae; plants; cherry waste; sludge from wineries; nut waste; food processing waste; coffee grounds; chicken manure; cow manure; hog manure; animals; forestry waste; farm waste; clippings; and bee attractant.

Materials 14 can also include but are not limited to: shredder residue; automobile components; wood; cellulose; fluff; electrical waste; electronic waste; and paper.

Materials 14 can also include but are not limited to: household waste materials: chip/snack bags; clothing, textiles, shoes; diapers; foam take-out containers; frozen good bags; juice boxes; lids, caps, tops; mail; magazines; mixed paper & catalogs; milk boxes; milk cartons; plastic bags; plastic bottles; plastic cups & utensils; plastic food boxes; plastic food trays; prescription vials; phone books; pill bottles; paint, inks, adhesives and resins; paper bags; paper or frozen food boxes; paper plates, cups & napkins; construction and demolition waste (including road construction); and books.

Materials 14 can also include but are not limited to: "Corrosive" substances and preparations which may destroy living tissue on contact; substances and preparations which present or may present immediate or delayed risks for one or more sectors of the environment.

Materials 14 can also include but are not limited to: "Explosive" substances and preparations which may explode under the effect of flame or which are more sensitive to shocks or friction than dinitrobenzene.

Materials 14 can also include but are not limited to: "Flammable" liquid substances and preparations having a flash point equal to or greater than 21° C. and less than or equal to 55° C.

Materials 14 can also include but are not limited to: "Harmful" substances and preparations which, if they are inhaled or ingested or if they penetrate the skin, may involve limited health risks.

Materials 14 can also include but are not limited to: "Infectious" substances containing viable micro-organisms or their toxins which are known or reliably believed to cause disease in man or other living organisms.

Materials 14 can also include but are not limited to: "Irritant" non-corrosive substances and preparations which, through immediate, prolonged or repeated contact with the skin or mucous membrane, can cause inflammation.

Materials 14 can also include but are not limited to: "Mutagenic" substances and preparations which, if they are inhaled or ingested or if they penetrate the skin, may induce hereditary genetic defects or increase their incidence.

Materials 14 can also include but are not limited to: "Oxidizing" substances and preparations which exhibit highly exothermic reactions when in contact with other substances, particularly flammable substances.

Materials 14 can also include but are not limited to: "Teratogenic" substances and preparations which, if they are inhaled or ingested or if they penetrate the skin, may induce non-hereditary congenital malformations or increase their incidence.

Materials 14 can also include but are not limited to: "Toxic" substances and preparations (including very toxic substances and preparations) which, if they are inhaled or ingested or if they penetrate the skin, may involve serious, acute or chronic health risks and even death. Toxic wastes such as the following can be utilized as carbon-based materials: Wastes containing arsenic, asbestos from electrolysis, cyanide and heavy metals such as mercury.

Hydrocarbon fuel 16 can comprise non-condensable gasses. The hydrocarbon fuel 16 can also include kerosene and/or diesel fuel as well as naphtha. Example non-condensable gasses can include C1-C4 hydrocarbons as well as CO and $H_2$. The hydrocarbon fuel can also comprise condensable gasses. Together, these gasses can have a carbon chain length range from C1 to about C-25 as well as a boiling point less than 382° C. According to example implementations, the hydrocarbon fuel can be a mixture of components. This mixture can have a boiling point substantially less than the boiling point of the liquid reaction media, or in the alternative, the boiling point of the liquid reaction media can have a boiling point substantially greater than the boiling point of the fuel mixture. Upon exposing the carbon-based material to the liquid reaction media, at least a portion of the fuel mixture can be formed. Fuel 16 can be vaporized upon formation and this vaporized fuel can be provided to a prime mover as described and/or a distillation apparatus as described by example herein. As stated above, the non-condensable fuel portion of the mixture can include C1 to C4 hydrocarbon compounds as well as CO and $H_2$. According to example implementations, this fuel mixture can comprise hydrocarbon compounds having greater than five carbon atoms. The carbon-based material can be substantially dry prior to being exposed to the liquid media. According to example implementations, the carbon-based material can have a moisture content less than about 16% (wt./wt.).

Reactor 12 can, according to example implementations, be referred to as a reaction zone, and this reaction zone can house the zeolite catalyst referred to above. According to example implementations, the exposing of the material can include exposing the material to the catalyst in the presence of the liquid media. According to example implementations, the reaction zone can also house the lime and the exposing can further include exposing the material to the catalyst to the lime in the presence of the media. Reactor 12 can be configured to house the liquid reaction media and receive solid carbon-based fuel. According to example implementations, the carbon-based material can be provided to reactor 12 utilizing a conveyor apparatus associated with reactor 12. The conveyor apparatus can be configured to convey the material to a receiving portion of the reactor.

According to an example implementation, a waste to fuel conversion process can be performed utilizing system 10. The process can include providing a low moisture carbon-based waste material such as that described herein, and exposing the waste material to a liquid reaction media under a substantially oxygen-free atmosphere within reactor 12. The process can continue by recovering gaseous hydrocarbon fuel 16 from reactor 12. As stated above, the waste material can comprise biomass, for example, and the low moisture carbon-based waste material can contain less than 16% (wt./wt.) water. According to example implementations, prior to the exposing of the carbon-based material to the liquid reaction media can include providing a substantially oxygen-free atmosphere above the liquid reaction media within reactor 12 and providing the waste material through the atmosphere and into the reaction media within reactor 12. This substantially oxygen-free atmosphere can include an atmosphere such as nitrogen, for example. According to example implementations, the liquid reaction media can be maintained at a temperature of at least about 270° C., or between from about 270° C. to about 582° C. during the exposing. The liquid reaction media can be agitated during the exposing and this agitation can include mechanical agitation, for example.

Figures 2A, 2B:
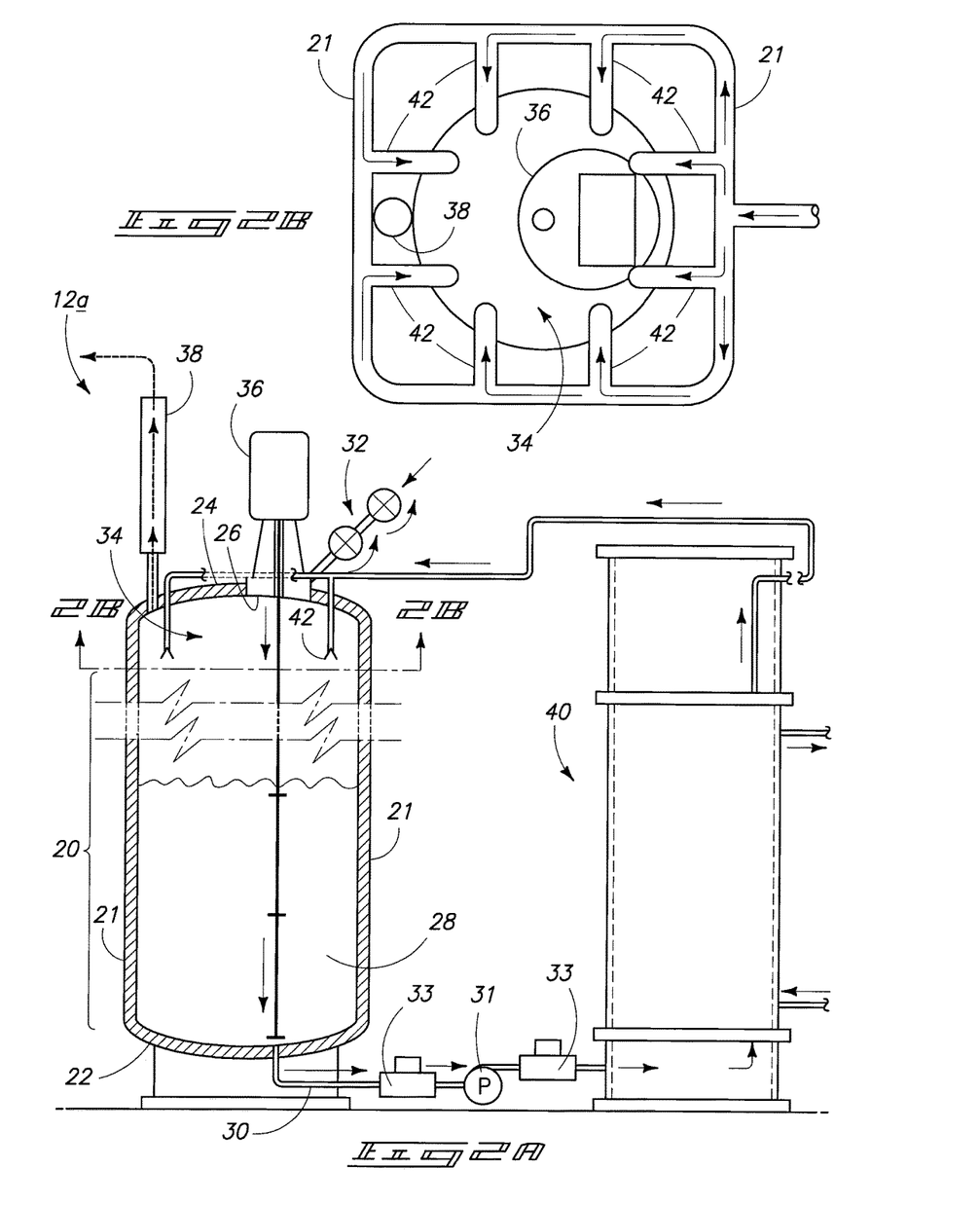
FIG. 2A is a portion of the system of FIG. 1 according to an embodiment of the disclosure.
FIG. 2B is a cross section of a portion of the system of FIG. 1 according to an embodiment of the disclosure.

Referring to FIGS. 2A and 2B, reactor 12a is shown that includes a waste material processing reactor as disclosed as configured to convert waste to fuel. This reactor 12a can include a substantially columnar vessel 12 that extends along vessel walls 21 from a base portion 22 to a top portion 24. Reactor 12a can have an opening 26 within top portion 24 of the vessel. The opening can be configured to receive carbon-based waste material, for example. Liquid media 28 can reside within reactor 12a and a liquid media conduit 30 can extend from base portion 22 to the top portion 24 of vessel 20. According to example implementations, this conduit can be configured to circulate liquid media 28 from base portion 22 to top portion 24, for example.

Materials of construction used for the systems described herein can include but are not limited to carbon steel and/or stainless steel. Implementations can include components constructed of Hastelloy as well. For example, vessel 12 can be constructed of carbon steel material for use in one embodiment. In other embodiments, vessel 12 can be constructed of Hastelloy where particularly acidic compounds such as fluoro and chloro compounds are anticipated as part of the feedstock.

Reactor 12a can be configured with an atmosphere exchange conveyor 32. Conveyor 32 can be configured as an inert gas purged air lock that includes tipping valves in combination with rotary valves. Conveyor 32 can be coupled to opening 26 and configured to exchange an oxygen-comprising atmosphere associated with waste material with a substantially oxygen-free atmosphere 34 within reactor 12a. Reactor 12a can also include an agitation apparatus 36. Example agitation apparatuses include mechanical agitation apparatuses such as propeller configured stirring apparatuses. This apparatus can extend to within the vessel and proximate base portion 22 of vessel 20. Reactor 12a can also include a hydrocarbon fuel recovery conduit 38. This conduit can be in fluid communication with the interior of vessel 20, for example. According to example implementations, conduit 30 can extend along vessel walls 22 on the exterior of the reactor. According to other implementations, conduit 30 can be coupled to a heat exchanger 40. According to example implementations, conduit 30 can have an internal diameter of at least 2.54 cm.

On either or both sides of pump 31 coupled to conduit 30 can be plug apparatus 33. Apparatus 33 can be proximate to pump 31, for example, and can include an exterior portion of conduit 30 as well a jacket defining a volume between the exterior portion of conduit 30 and the jacket. The jacket can define a continuous volume surrounding the entire perimeter of the exterior portion of the conduit. Apparatus 33 can be configured to receive and contain a refrigerant composition within the volume defined between the jacket and the exterior portion of conduit 30. An example refrigerant can include liquid nitrogen.

According to example implementations pump 31, for example, can be serviced by providing refrigerant material to apparatus 33 to at least partially solidifying portions of the reactant media proximate the pump and within each of the inlet and/or outlet conduits. Pump 31 can then be uncoupled from either of the conduits while maintaining a majority of the reactant media within the conduits.

Referring to cross section 2B, in conjunction with FIG. 2A, a plurality of nozzles can extend to within and be in fluid communication with the interior of vessel 20. According to example implementations, and referring to FIG. 2, these nozzles can be arranged around portion 24 within vessel 20. The nozzles can be configured to provide liquid media 28 to within vessel 20 as received from conduit 30. According to example implementations, the nozzles may form a perimeter around opening 26 in portion 24 of vessel 20. Nozzles 42 can be configured to provide media 28 in substantially the same direction as the travel of waste material upon entry into the vessel. According to example implementations, with reference to the configuration of reactor 12a, this direction can be a substantially downward direction.

Figure 3:
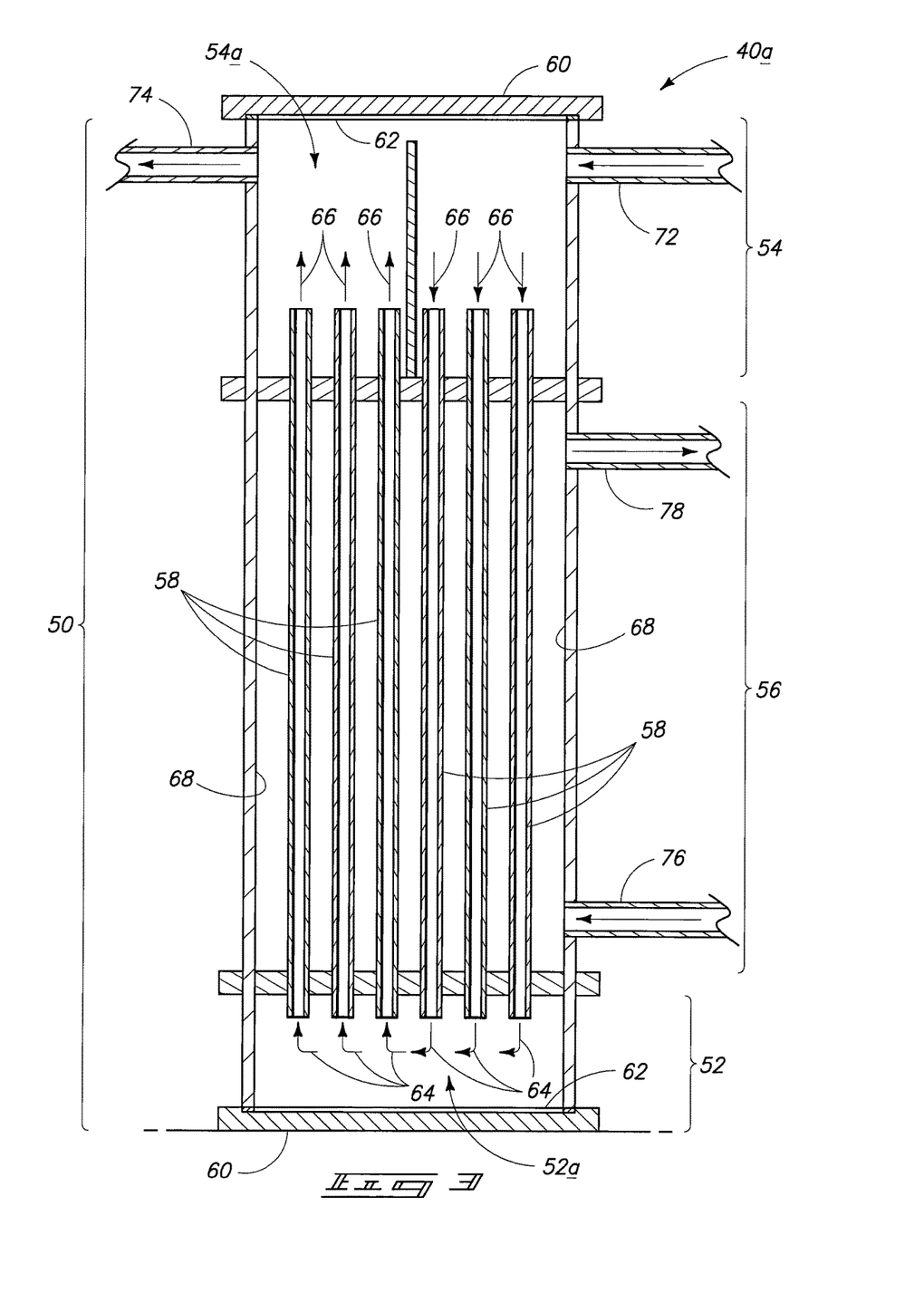
FIG. 3 is a cross section of a portion of the system of FIG. 1 according to an embodiment of the disclosure.

Referring to FIG. 3, an example configuration of heat exchanger 40 is shown as heat exchanger 40a. Heat exchanger 40a includes a vessel 50 extending along a plane from an inlet portion 52 to an outlet portion 54. According to example implementations, the inlet and outlet portions define continuous respective volumes 52a and 54a. Vessel 50 can include a heating media compartment 56 which is defined by vessel 50 and is located along the plane between inlet portion 52 and outlet portion 54. The exchanger also includes a plurality of conduits 58 within vessel 50. The individual conduits 58 can extend from the inlet portion volume 52a through the heating media compartment 56 and to outlet portion volume 54a. The conduits can be configured to maintain a fluid communication between the volumes of the inlet and outlet portions.

According to example implementations, vessel 50 can be substantially columnar and inlet and outlet portions 52 and 54 can be at opposing ends of the columnar vessel 50. According to example implementations, inlet and outlet portions 52 and 54 can be configured with removable caps 60. Caps 60 can be affixed to vessel 50 utilizing gasket material, for example. Each of caps 60 comprise an interior facing surface 62, and this interior facing surface can define at least a portion of the respective continuous volume 52a and/or 54a. Within heat exchanger 40a, each of the individual conduits 58 define an inlet opening 64 extending to an outlet opening 66. Each of these inlet and outlet openings 64 and 66 of conduits 58 can be associated respectively with each of the inlet and outlet portions 54 and 52 of vessel 50. According to example implementations, openings 64 and 66 can be aligned substantially normal to face 62 of caps 60. Conduits 58 can also be aligned substantially parallel with interior walls 68 of vessel 50. According to an example implementation, the conduits can be aligned substantially normal to the inlet and outlet portions 52 and 54 of vessel 50. Inlet and outlet portion 52 and 54, respectively, of heat exchanger 40A can define respective inlet and outlet ports 72 and 74 respectively. These inlet and outlet ports can be configured to receive and dispense fluid to be heated. For example, such fluid to be heated can include the liquid reaction media for use in reactor 12 of FIG. 1, for example.

Under some process conditions, conduits 58 can become restricted or even plugged. One or both of caps 60 can be removed and an apparatus used to expel any or all materials that may be restricting flow through conduits 58.

According to example implementations, media compartment 56 can define inlet and outlet ports 76 and 78. These inlet and outlet ports can be configured to receive and dispense a heating fluid. Such heating fluid can include but is not limited to Thermanol® VP1 heat transfer fluid by Solutia (Solutia, P.O. Box 66760, St. Louis, Mo. 63166-6760; (314) 674-1000).

Figure 4:
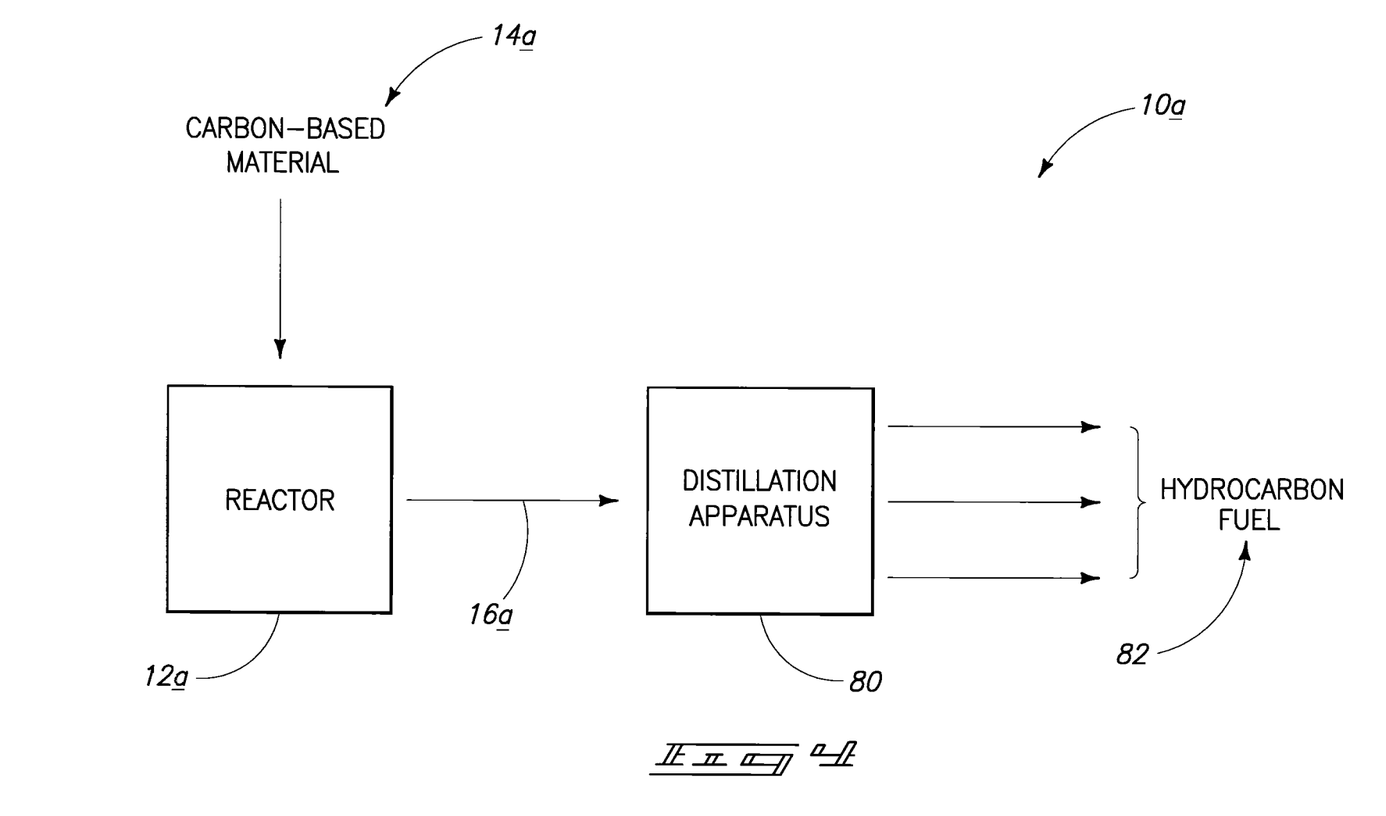
FIG. 4 is a system according to an embodiment of the disclosure.

Referring to FIG. 4, system 10a is provided that includes a reactor 12a configured to receive carbon-based material 14a and provide hydrocarbon fuel 16a. System 10a further comprises a distillation apparatus 80 that may be configured to separate portions of hydrocarbon fuel 16a into discrete hydrocarbon fuel portions 82. According to example implementations, solid carbon-based material 14a can be exposed to a liquid reaction media within reactor 12a to form a hydrocarbon fuel mixture 16a. This hydrocarbon fuel mixture 16a can include non-condensable hydrocarbon fuel and condensable hydrocarbon fuel, for example. Distillation apparatus 80 can be configured to separate the non-condensable hydrocarbon fuel from the condensable hydrocarbon fuel and form discrete hydrocarbon fuel portions 82. According to example implementations, the liquid reaction media within reactor 12a can be blanketed with a substantially oxygen-free atmosphere and upon exposing the carbon-based material to the liquid reaction media, the fuel mixture 16a formed can include at least a portion of this oxygen-free atmosphere.

Utilizing distillation apparatus 80, at least this portion of the oxygen-free atmosphere can be separated from the non-condensable and condensable fuels within discrete hydrocarbon fuel portions 82. According to example implementations, distillation apparatus 80 can be configured to distill fuel mixture 16a. Portions 82 of hydrocarbon fuel can also include naphtha as well as kerosene and diesel fuel portions. Distillation apparatus 80 through fractional distillation and design can be configured to separate these discrete hydrocarbon fuel portions.

Figure 5A:
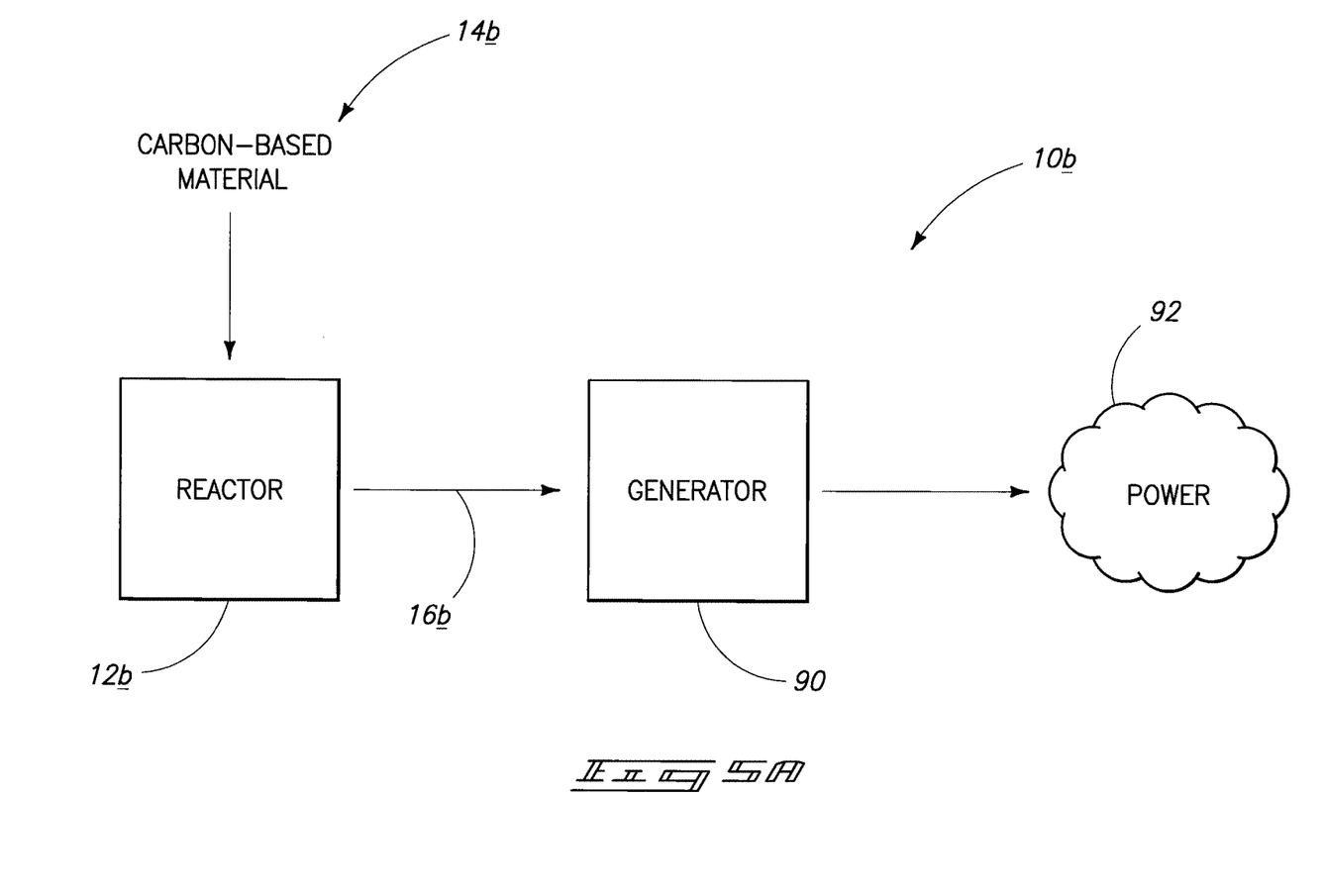
FIGS. 5A and 5B depict a system according to an embodiment of the disclosure.
Figure 5B:
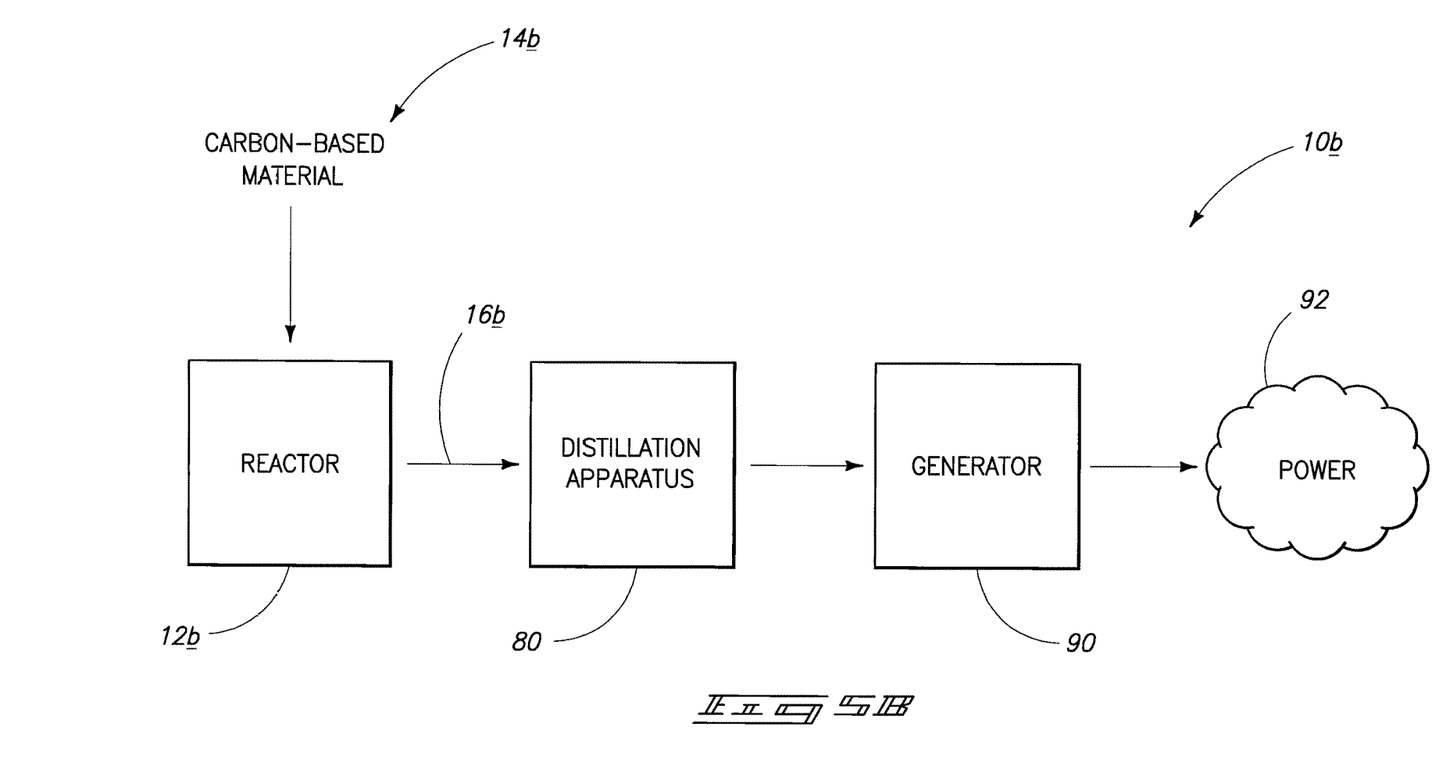

Referring now to FIGS. 5A and 5B, a system 10b is disclosed that includes a reactor 12b coupled to a generator 90 which is utilized to produce power 92. Generator 90 can be considered a prime mover with example prime movers including but not limited to combustion turbines. According to example implementations, carbon-based material 14b can be exposed to a liquid reaction media within reactor 12b to form a hydrocarbon fuel mixture 16a. This hydrocarbon fuel mixture 16a can include non-condensable hydrocarbon fuels, for example. According to example implementations, this hydrocarbon fuel can be provided to generator 90. Example combustion turbines include but are not limited to gas, liquid, and combination gas/liquid fired combustion turbines.

According to example implementations, the carbon-based material can be provided to the liquid reaction media in the presence of a substantially oxygen-free atmosphere. Fuel mixture 16a can include this substantially oxygen-free atmosphere and prior to providing this fuel mixture 16a to generator 90, at least a portion of or all of this substantially oxygen-free atmosphere can be removed. Example oxygen-free atmospheres contain nitrogen and/or product vapor such as hydrocarbons, CO, and/or $H_2$.

According to an example implementation, a mixture comprising fuel mixture 16a can include the non-condensable hydrocarbon fuel in the atmosphere. The fuel can be separated from the atmosphere and then this fuel provided to generator 90. An example method for separating the nitrogen-containing atmosphere from the fuel can include distilling the fuel mixture 16a but in doing so, in providing this process, the hydrocarbon fuel can be substantially free of nitrogen and/or water upon being provided to generator 90. According to example implementations, the combustion turbine can be configured to provide at least 2.5 megawatts of electricity in the form of power 92. Prior to providing this fuel mixture 16a, according to other example implementations, non-condensable hydrocarbon fuel within mixture 16a can be separated from condensable hydrocarbon fuel and then non-condensable hydrocarbon fuel provided to generator 90 while providing the condensable hydrocarbon fuel for either storage or another source.

Referring to FIG. 5B, system 10b includes both a distillation apparatus 80 and a generator 90 configured to receive hydrocarbon fuel from distillation apparatus 80 and generate power 92 therefrom.

Figures 6A, 6B:
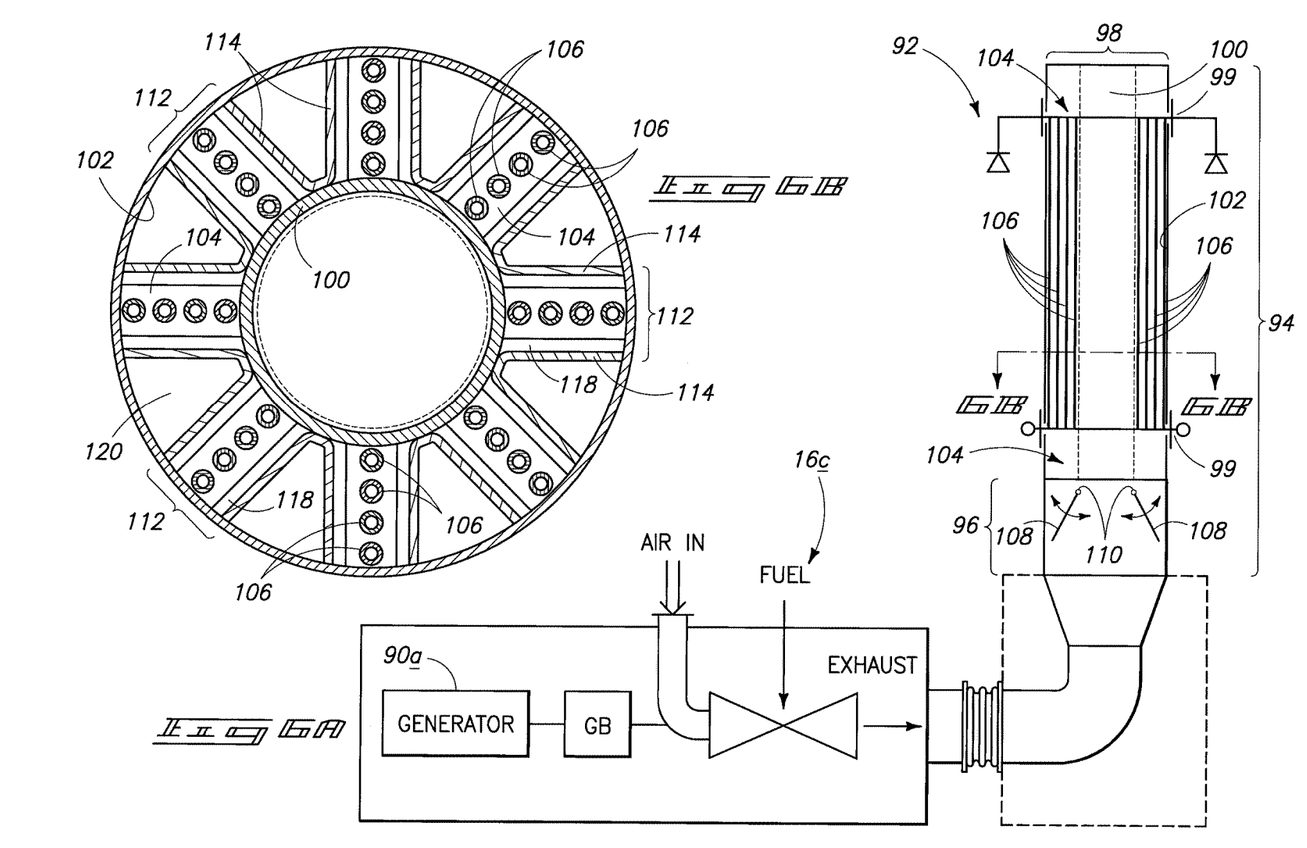
FIG. 6A is a portion of the system of FIG. 5A or FIG. 5B according to an embodiment of the disclosure.
FIG. 6B is a cross section of a portion of the system of FIG. 5A or FIG. 5B according to an embodiment of the disclosure.

Referring to FIGS. 6A and 6B, a generator 90a is provided having a combustion turbine exhaust apparatus 92. Apparatus 92 can include a substantially columnar housing 94 extending along a plane from an inlet portion 96 to an outlet portion 98. Apparatus 92 can further include a substantially columnar exhaust chute 100 within housing 94 and extending parallel along the same plane as housing 94. Exhaust chute 100 can be recessed from walls 102 of the housing of housing 94, the exhaust chute 100 and housing defining a space 104 between chute 100 and housing 94. Apparatus 92 further comprises a plurality of heating fluid conduits 106 within space 104. Apparatus 92 further comprises dampers 108 associated with inlet portion 96 of housing 94. According to example implementations, dampers 108 can be configured to manipulate the flow of exhaust from the turbine between chute 100 and space 104. Dampers 108 can be hinged at 110 proximate the exhaust apparatus 92.

Apparatus 92 can include telescoping portions 99. According to example implementations, telescoping portions 99 can be provided along housing 94 between portions 96 and 98 for example.

Referring to FIG. 6B, one cross-section of apparatus 92 is shown. According to example implementations, the plurality of heating conduits 106 can comprise separate groups of conduits 112. Individual groups of conduits can comprise at least conduits within a channel defined by channel walls 114. These groups can extend between chute 100 and housing 94. Channel walls 114 can extend substantially normal between housing interior surface 102 and chute wall 116. These channel walls and groups can extend a substantial portion parallel along the plane within space 104 between housing wall 102 and chute wall 116. These channels can extend substantially parallel with the walls of the chute and housing. The walls can define a continuous volume 118 extending between inlet portion 96 and outlet portion 98 of the apparatus. Groups 112 can be dispersed around a perimeter of the chute and according to example implementations, the groups can be evenly dispersed around the chute. Baffles 120 can extend between groups 112, thereby forcing the exhaust gasses to pass proximate conduits 106.

Figure 7:
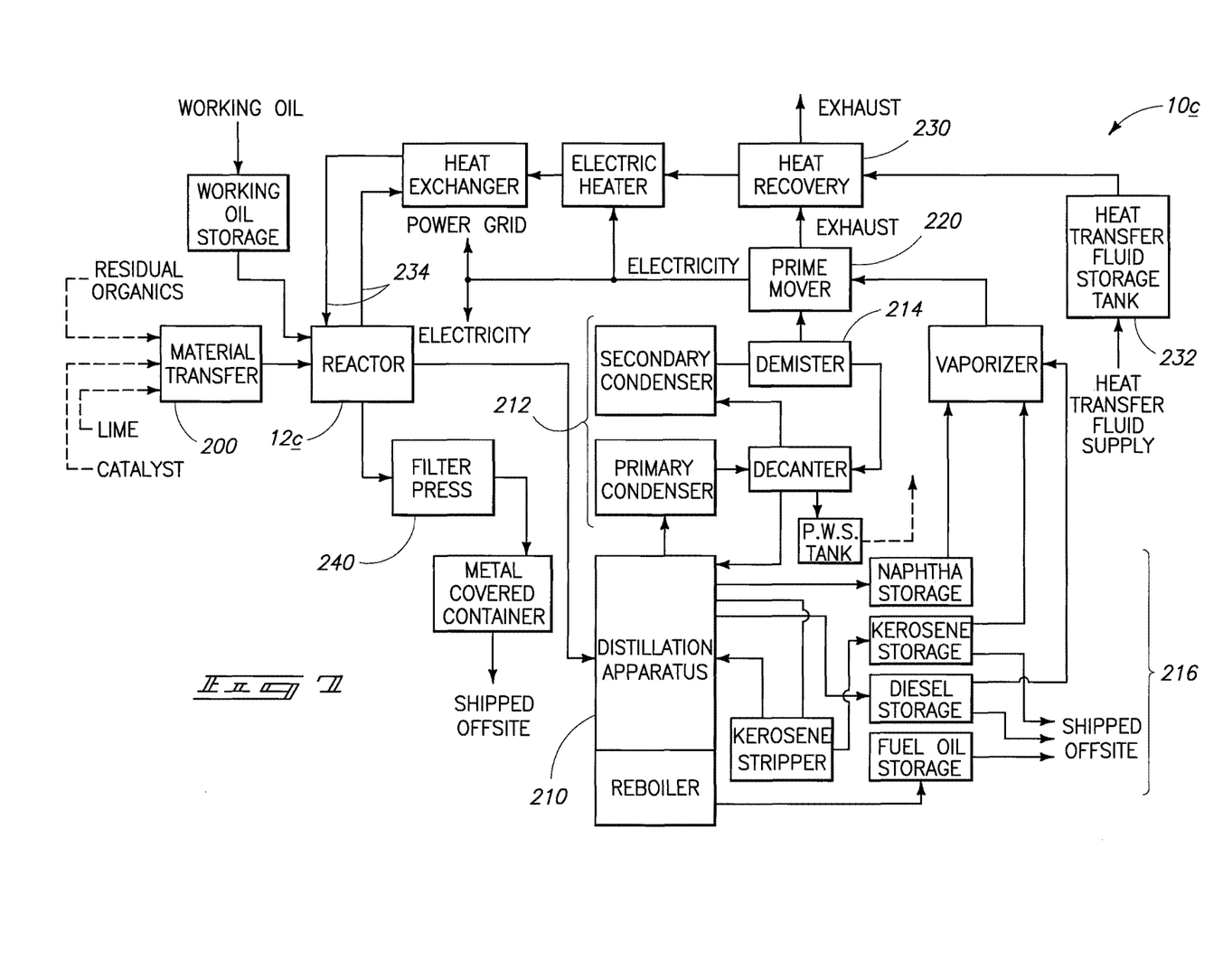
FIG. 7 is a system according to an embodiment of the disclosure.

Referring to FIG. 7, fuel generation system 10c is provided that includes a reactor 12c configured to house a liquid reaction media and receive solid carbon-based material via material transfer apparatus 200. System 10c can include a distillation apparatus 210 coupled to the reactor and configured to receive gaseous hydrocarbon fuel from the reactor. System 10c can also include a combustion turbine 220 coupled to the distillation apparatus and configured to receive distillate portions from the distillation apparatus. As an example implementation, material transfer apparatus 200 can be configured as a conveyor apparatus associated with reactor 12c. The conveyor apparatus can be configured to convey material to a receiver portion of reactor 12c. System 10c can also include a heat exchanger 230 coupled to the reactor. Heat exchanger 230 can be configured to heat the liquid reaction media of reactor 12c by providing heat from a heat exchanger fluid such as that stored in heat transfer fluid storage tank 232.

According to another example implementation, heat exchanger 230 can be coupled to turbine 220, for example, coupled to the exhaust of turbine 220. As an example, the heat exchanger fluid can circulate within the exhaust apparatus of the heat exchanger of the combustion turbine. System 10c can include a media circulating conduit 234 configured to circulate liquid reaction media between the reactor and the heat exchanger 230, for example. These conduits can define an access configured to allow for removal of a portion of the media during circulating. Filter press 240 can be in fluid communication with this access, for example.

According to example implementations, distillation apparatus 210 can also include condensers 212. These condensers can be configured to receive gaseous compounds from apparatus 210 and the condensers can also be ranged in serial condenser decanter configurations. These condenser-decanters can be configured to receive gaseous compounds from distillation apparatus 210 and return liquid compounds to distillation apparatus 210. According to example implementations, a portion of distillation apparatus 210 can include a demister 214 coupled to one of condensers 212. This demister can be configured to demist gaseous compounds received from the condenser and provide these demisted gaseous compounds directly to combustion turbine 220, for example. In this configuration, condensers 212 can be directly in line between distillation apparatus 210 and combustion turbine 214.

According to example implementations, distillation apparatus 210 can be configured to separate portions of hydrocarbon fuel 216. These portions 216 can include any one or more of fuel oil, kerosene, diesel, naphtha, and/or non-condensable hydrocarbon fuel such as $CO$ and/or $H_2$. In accordance with the utilization of system 10c, a fuel generation process can be utilized that provides for exposing a solid carbon-based material to a liquid reaction media to form a mixture of hydrocarbon fuel 216. The fuel can be separated into at least two portions, with a first portion and a second portion. The first portion can be provided to a combustion turbine to generate power, and the second portion can be used for liquid fuel. The substantially dry carbon-based material can be exposed to an oxygen-free reaction zone housed in liquid reaction media, for example, and the separating can include separating a substantially oxygen-free atmosphere from the fuel before separating the fuel into two portions. The first portion of these fuels can include the non-condensable hydrocarbons, and the second portion can comprise the condensable hydrocarbons. According to another implementation, the first portion can comprise non-condensable hydrocarbons and kerosene, and the second portion can comprise diesel fuel, for example. This first portion can be provided to the combustion turbine, and prior to providing to the combustion turbine, this portion can be vaporized.

According to example implementations, the liquid media can be heated with a heat transfer fluid, and the providing of the fuel can include generating power as well as an exhaust from the combustion of the turbine wherein the exhaust is used to heat the heat transfer fluid.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A waste material processing reactor configured to convert waste to fuel, the reactor comprising:
   a substantially columnar vessel extending along the vessel walls from a base portion to a top portion;
   an opening within the top portion of the vessel, the opening configured to receive solid carbon-based waste material;
   a liquid media conduit extending from the base portion to the top portion of the vessel, the conduit configured to circulate liquid media from within the base portion of the reactor to the top portion of the reactor; and
   a plurality of nozzles arranged around the top portion within the vessel, the nozzles in fluid communication with the liquid media conduit and configured to provide the liquid media to within the vessel.

2. The reactor of claim 1 wherein the vessel is constructed primarily of carbon steel material.

3. The reactor of claim 1 further comprising an atmosphere exchange conveyor coupled to the opening, the exchange conveyor configured to exchange an oxygen-comprising atmosphere associated with the waste material with a substantially oxygen-free atmosphere within the reactor.

4. The reactor of claim 1 wherein the opening is also configured to receive an agitation apparatus.

5. The reactor of claim 4 wherein the agitation apparatus comprises a mechanical agitation apparatus that extends to within the vessel and proximate the base of the vessel.

6. The reactor of claim 1 further comprising a hydrocarbon fuel recovery conduit coupled to the reactor and in fluid communication with the interior of the vessel.

7. The reactor of claim 1 wherein the liquid media conduit extends along the vessel walls on the exterior of the reactor.

8. The reactor of claim 1 wherein the liquid media conduit is coupled to a heat exchanger.

* * * * *